United States Patent [19]

Adler et al.

[11] E Patent Number: Re. 32,189

[45] Reissued Date of Patent: Jun. 24, 1986

[54] RAILWAY HOPPER CAR ROOF SUPPORT STRUCTURE

[75] Inventors: Franklin P. Adler, Michigan City, Ind.; Marvin Stark, Houston, Tex.

[73] Assignee: Richmond Tank Car Company, Houston, Tex.

[21] Appl. No.: 587,507

[22] Filed: Mar. 8, 1984

Related U.S. Patent Documents

Reissue of:

[64] Patent No.: 4,275,662
Issued: Jun. 30, 1981
Appl. No.: 56,213
Filed: Jul. 10, 1979

[51] Int. Cl.[4] ..... B61D 17/16; B61D 39/00; B61D 49/00

[52] U.S. Cl. ..... 105/377; 52/56; 105/248; 105/406 R

[58] Field of Search ..... 105/247, 248, 377, 396, 105/404, 406 R, 409; 52/45-56

[56] References Cited

U.S. PATENT DOCUMENTS

| | | | |
|---|---|---|---|
| 1,055,698 | 3/1913 | Bettendorf | 52/56 X |
| 1,365,216 | 1/1921 | Anderson | 105/248 |
| 1,474,814 | 11/1923 | Campbell | 105/406 R X |
| 2,034,081 | 3/1936 | Bonsall | 52/46 |
| 2,034,376 | 3/1936 | Bonsall | 52/46 |
| 2,034,385 | 3/1936 | Bonsall | 52/46 |
| 2,073,513 | 3/1937 | Dietrichson et al. | 105/248 |
| 2,092,293 | 9/1937 | Swann | 52/46 |
| 2,225,170 | 12/1940 | Gilpin | 105/404 |
| 3,035,161 | 5/1962 | Kalt | 105/397 X |
| 3,090,160 | 5/1963 | Shaver et al. | 105/377 X |
| 3,145,665 | 8/1964 | Hamilton | 52/55 X |
| 3,176,630 | 4/1965 | Schmeider | 105/377 |
| 3,339,499 | 9/1967 | Charles et al. | 105/248 |
| 3,434,256 | 3/1969 | Eggert, Jr. | 52/46 X |
| 3,442,225 | 5/1969 | Mowatt-Larssen | 105/409 |
| 3,476,042 | 11/1969 | Carney, Jr. et al. | 105/377 |
| 3,486,277 | 12/1969 | Bauer | 52/46 |
| 3,515,051 | 6/1970 | Pulcrano | 105/247 X |
| 3,572,252 | 3/1971 | Coover et al. | 105/248 |
| 3,599,575 | 8/1971 | Yurkoski | 280/5 R X |
| 3,789,773 | 2/1974 | McNally et al. | 105/248 |
| 3,844,229 | 10/1974 | Martin | 105/248 |

*Primary Examiner*—Randolph A. Reese
*Attorney, Agent, or Firm*—Pravel, Gambrell, Hewitt & Kimball

[57] ABSTRACT

A roof structure for covered hopper cars has roof sheets with curved sections disposed on each side of a continuous trough hatch opening. A hollow, beam-type side plate connects the outer margins of the roof sheets to the side wall unit and includes an outer transition member with a curved section forming part of the side plate and also having a lip extending inwardly of the vehicle to form a continuation of the curved roof sheet. A connection piece underlies transversely extending edges of the roof sheets to join the sheets. Intermediate bulkheads or partition sheets have a rounded top to fit snugly for attachment to the curved roof sheets and are rigidified by stiffeners which extend horizontally and transversely of the vehicle from side plate to side plate and are connected thereto to join with the roof sheets and intermediate bulkheads to form a rigid roof beam which resists twisting and deflecting during transit.

6 Claims, 7 Drawing Figures

38
36
34
32
42
22
40
42

28
15
13
6
6
15
28
4
4

28
30
38
32
22
15
36
21a
13
14
20
15
21
34
38
30
28
32
22

RAILWAY HOPPER CAR ROOF SUPPORT STRUCTURE

Matter enclosed in heavy brackets [ ] appears in the original patent but forms no part of this reissue specification; matter printed in italics indicates the additions made by reissue.

BACKGROUND OF THE INVENTION (1) Field of the Invention

This disclosure pertains to railway covered hopper cars and in particular to the roof and side plate section of the hopper cars.

(2) Description of the Prior Art

The prior art has shown a number of roof structures for increasing the volume of a hopper car while retaining the outside dimensions of the vehicle within the so-called clearance lines. Heretofore, a number of structures have been attempted including stepped roofs and rounded roof arrangements which combine with curved sides. While these prior designs have met with some limited success, there has been a continuing search for a simple, low cost structure which can be easily adapted to fit flat side hopper cars and which will not only increase the volumetric capacity, but will also provide a rigid structure which does not deflect excessively in transit and which has a long life span.

SUMMARY

This disclosure pertains to a curved roof structure for railway hopper cars having a number of hoppers defined by end slope sheets and intermediate bulkheads or partitions which extend transversely of the vehicle to interconnect spaced side walls. To prevent excessive downward deflection of the curved roof sheet members which in turn bulges the side plate unit outwardly of the vehicle, this disclosure shows a unique rigidifing structure which provides a hollow, beam type side plate having structural integrity in both a horizontal and vertical direction. By positioning angle members to extend across the intermediate bulkhead and interconnect the spaced side plates, a rigid structure is provided which prevents outward, horizontal bulging of the side plate and further rigidifies the roof structure by dumping vertical, horizontal and twisting forces from the roof and side plates into the large web of the intermediate bulkheads.

Other structural members are provided at the end of the trough hatch structure which assist in evenly distributing forces encountered during loading and transit to prevent stress concentration at the end of the roof structure and evenly distribute forces throughout the end of the vehicle. A rigidifying, ramp-type of member is located at each end of the trough hatch opening and extends downwardly from the end coaming of each trough hatch to the end bulkhead of the vehicle. A connector plate overlaps and interconnects adjacent portions of the longitudinally extending coaming and an upstanding leg portion of the stiffener to evenly dump longitudinal forces into the stiffener member for distribution through the end portion of the roof and into the car end structure.

A connection piece extends across the top of the arcuate portion of each intermediate bulkhead and overlaps the adjacent roof sheet portions to assist not only attaching the roof sheet ends but also in providing a transition piece for distributing forces downwardly into the intermediate bulkheads.

It is thus noted by the foregoing that it is an object of this disclosure to provide a railway hopper car having a roof structure comprising arcuate roof sheet portions extending from a hatch opening outwardly and downwardly for connection into an extended lip portion of the vehicle side plate.

It is another object of this disclosure to show a side plate construction for a railway covered hopper car whereby a composite, tubular beam member is formed by a first angle member securely attached to the side sheets and side posts of the vehicle and a second, overlapping and contoured member having a lip extension that forms a continuation of the roof sheet.

It is yet another object of this disclosure to provide a rigidified roof structure providing curved roof sheets vertically supported by intermediate bulkheads having contoured portions adapted to match the contour of the roof sheets and extending to connection pieces which join the top of the arcuate bulkhead sections and the roof sheets to rigidify and provide for even distribution of roof forces into the intermediate bulkheads and side walls.

Yet another object of this disclosure is to provide a rigidified roof, side plate, and supporting structure comprising bulkhead members with rigidifying braces attached on opposite sides of the bulkhead in a stepped fashion and extending from side plate to side plate.

It is another object of this disclosure to provide stiffener members located at each end of the trough hatch opening and comprising a wedge-shaped section having upstanding legs forming extensions of the longitudinal coaming of the trough hatch and including a connector plate adapted to structurally interconnect the longitudinal coaming with the upstanding legs of the stiffener member to reduce stress concentrations at the end of the trough hatch opening to prevent fatigue failures and stress cracking of the roof sheets.

These and other objects of this disclosure will become apparent to those having ordinary skill in the art with reference to the following description, drawings, and appended claims.

DESCRIPTION OF THE PREFERRED EMBODIMENT

Figure 1:
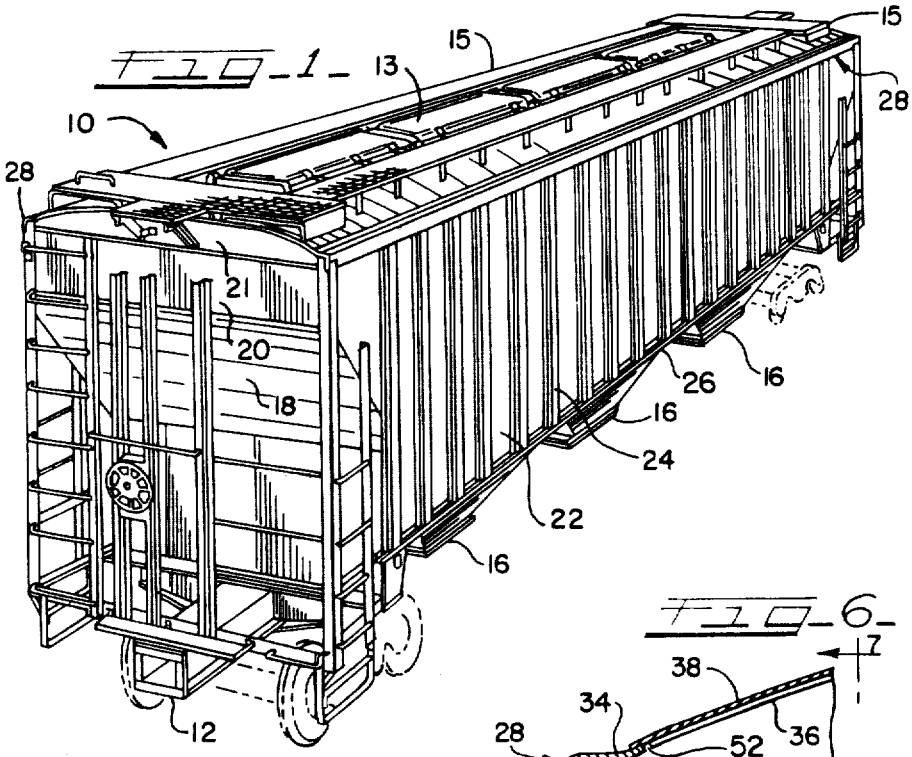
FIG. 1 is a pictorial illustration of a railway covered hopper car having the roof structure disclosed herein.

Referring now to the drawings, and in particular to FIG. 1, there is shown a railway hopper car designated generally by the numeral 10 which includes a longitudinally extending center sill which extends from end to end of the vehicle and contains the usual draft sill portion 12 and coupling at each end (not shown). The top portion of vehicle 10 is enclosed by a number of adjacent, hinged trough hatch covers 13 which cover a trough hatch opening which is designated generally by the numberal 14. A pair of running boards or walkways 15 may extend the length of the car on each side of the hatch covers 13 and are interconnected at each end by a short platform section which allows maintenance and operating personnel to move safely and freely between adjacent hopper cars.

Figures 2, 4, 7:
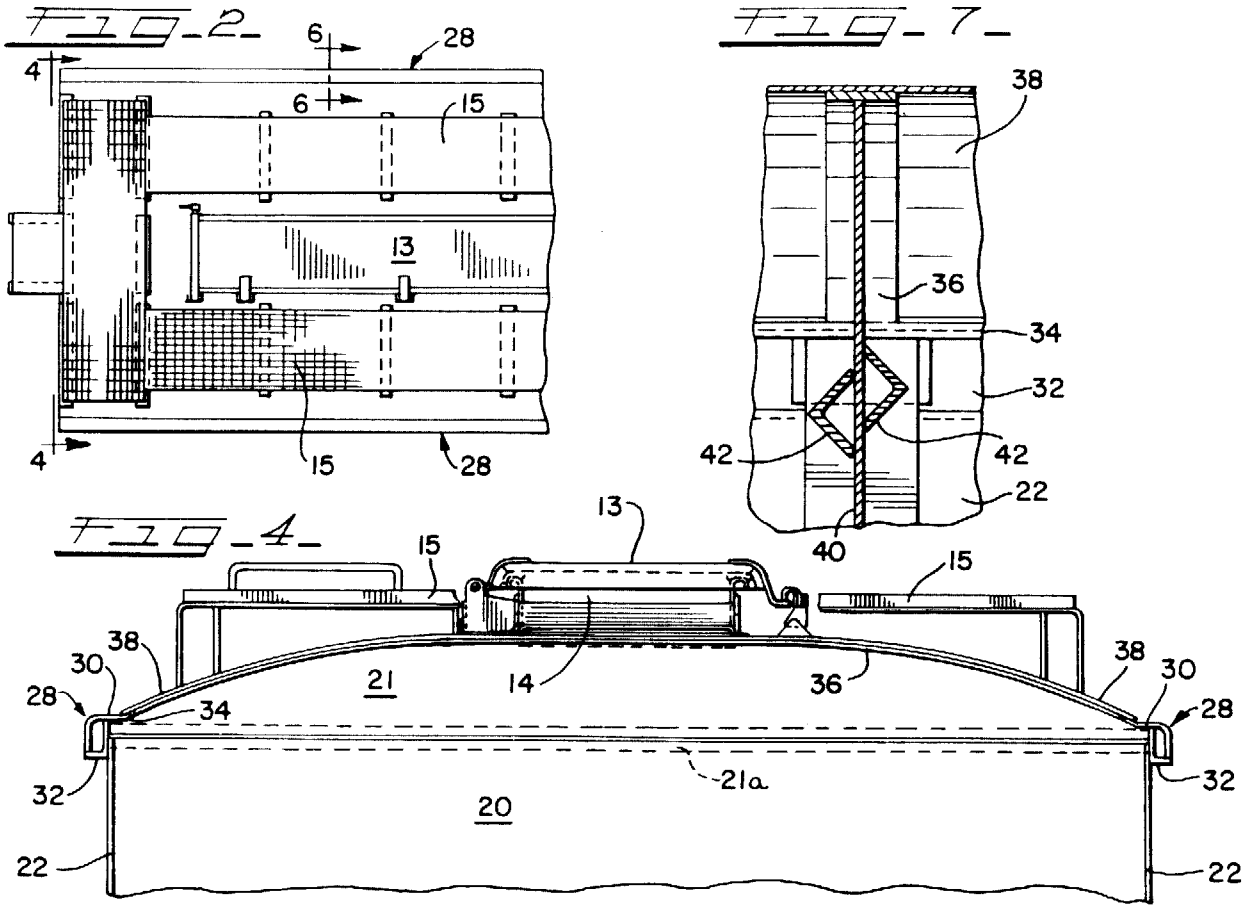
FIG. 2 is a top view of a portion of the vehicle shown in FIG. 1.
FIG. 4 is a view taken generally along lines 4—4 of FIG. 2.
FIG. 7 is a view taken generally along lines 7—7 of FIG. 6.

As is generally true with conventional hopper cars, there *are* a number of hoppers provided for storage and transport of lading. There are two so-called end hoppers and one or more intermediate hoppers depending upon the size of the hopper car. Lading contained within the hoppers is discharged through the discharge opening 16 located at the bottom of the vehicle. Pneumatically operated or gravity-type discharge devices may be used to remove material from the hoppers. Specifically, the end hoppers are defined by end slope sheets 18 which extend downwardly and inwardly from the end of the vehicle at an angle to allow for complete and rapid discharge of lading. End bulkhead 20 extends upwardly from the end slope sheet 18. As shown in FIG. 4, a so-called end bulkhead extension 21 has a straight bottom portion which is secured to the end bulkhead 20 and also has a contoured top edge to fit snugly with the roof structure. A connecting plate 21a is located on the inside of the vehicle and overlaps the end bulkhead 20 and the end bulkhead extension 21 to form a secure, welded connection between these two, flat plate members.

Referring once again to FIG. 1, it is noticed that the covered hopper car 10 includes a number of vertically extending, spaced side posts 24 which are shown in the illustrations as having a hat-shaped contour; however, it is understood that modifications in this type of structure in the vehicle could be made by replacing the hat-shaped posts with another shape of convenient cross section such as a U-shape or V-shape contour, without departing from the scope of this invention. Also shown in FIG. 1 is the normal longitudinal extending side sill 26 which extends from end to end of the vehicle and is used to dump and evenly distribute longitudinal as well as transverse bulging forces into the side wall members.

Spaced vertically above the side sill 26 is so-called top chord or side plate 28 which, like the side sill, extends the length of the vehicle and provides a structural beam member for the wall and for the roof units. The side plate design is critical because this member forms not only a portion of side wall beam which rigidifies the entire side wall structure, but also forms an integral part of a roof beam which rigidifies the roof, prevents excessive deflection and also prevents excessive bulging of the top portion of the side wall unit.

Figure 6:
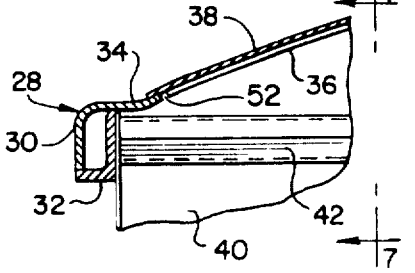
FIG. 6 is an enlarged sectional view taken generally along lines 6—6 of FIG. 2.

Referring now to FIGS. 4, 7, and 7, the specific structure of the car roof, and other related structural items will be examined. As shown in FIG. 6, the side plate 28 is composed of a so-called transition plate 30 and a beam angle 32. The beam angle is attached to the side sheets 22, [wall] *side* posts 24 and forms a top cover for each of the side posts 24 as shown in FIG. 1. Transition plate 30 is welded to and encloses the side plate hollow beam 28 and includes a lip portion 34 which extends inwardly and upwardly to receive, overlap and join with the contoured roof sheet 38. As shown in FIG. 6, a connection bar 36 is located at the junction of the transverse edges of adjacent roof sheets 38 and thus assists in interconnecting the roof sheets and attaching the roof sheets 38 to the intermediate bulkheads 40. Each intermediate bulkhead 40 includes a large web section extending from the side sill 26 to the side plate 28 and also extending across the roof of the vehicle. This bulkhead structure provides not only a member for separating lading in adjacent hoppers but also provides an important structural member to the vehicle. Bulkhead 40 includes a carved top portion shown in FIG. 6 that extends above the side plate 28 and conforms to the contour of the roof sheets 38. As shown in FIG. 6, the connection piece 36 is located atop each intermediate bulkhead so as to facilitate connection of adjacent roof sheets with one another and also to facilitate connection of the roof sheets 38 with the intermediate bulkhead 40. As shown in FIGS. 6 and 7, a pair of structural members disclosed as L-shaped angle irons are attached at the top portion of the bulkhead 40 and extend from side plate to side plate. The stiffeners 42 are welded to the intermediate bulkhead 40 at vertically staggered positions so that the relatively thin intermediate bulkhead will not suffer a burn through during welding to the bulkhead 40 as could occur if the stiffeners were located at the same point on each side of the bulkhead.

Thus, it is noticed that with the rigidifying structure disclosed herein, curved roof sheets 38 extend downwardly and outwardly from upstanding coaming 46 to a point where each interconnected with the lip extension 34 of the vehicle side plate 28. It is noticed that the metal, lath-like connection piece 36 which adapts the roof sheets to the intermediate bulkheads 40 is a continuous member extending from side to side of the vehicle and thus extending across the trough hatch opening 14. Thus, the structural rigidity lost by the trough hatch opening is compensated for by the additional structure provided with the stiffeners 42 which interconnect side plates 28 and also compensated for by the curved roof sheets and attached connection piece 36 which securely attaches the roof sheets to the intermediate bulkheads and which also extend from side to side of the vehicle to maintain the spaced coaming 46 in a secured position.

As shown in FIGS. 6 and 7, the top portion of the bulkhead 40 provides a reinforced arch comprising the connection piece 36, side plate [30] *28*, and lateral stiffeners 42. The transition lip 34 of the side plate member 30 connects with the roof sheets 38 and with the connection piece 36 at 52 (FIG. 6) to provide a continuous roof member for even force distribution into the entire side plate 28 and side wall. Thus, the roof between adjacent hoppers resembles a portion of a cylinder. [This] *That* is, the roof sheets are formed to a radius of approximately 8 feet, 8 inches, and the side plates 28 and stiffeners are attached to form a reinforced periphery of the cylinder segment. The reinforcing arrangement provides a curved roof having improved resistance to vibration yet also having improved resistance to deflection and twisting due to the segment-of-a-cylinder construction.

Figure 5:
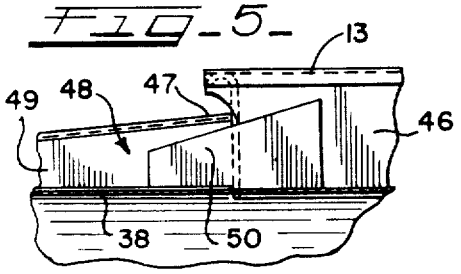
FIG. 5 is an enlarged side sectional view of the structure shown in FIG. 3.
Figure 3:
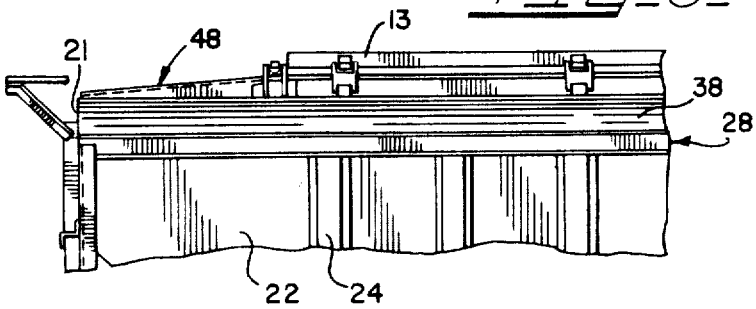
FIG. 3 is an elevational view of the top end portion of the vehicle with portions removed.

Because the trough hatch opening 14 extends generally from end to end of the vehicle 10, the ends of the roof can frequently *be* a source of stress cracks and fatigue failures unless adequately reinforced. Thus, as shown in FIGS. 3 and 5, a rigidifying stiffener 48 having a generally U-shaped section with downwardly extending legs 49 welded to the roof sheet 38 has an open end section welded to the end portion of coaming 47. Stiffener 48 tapers from a point well above the roof line where it is attached to the end coaming 47 to a point just above the end bulkhead extension 21. Thus, this tapered configuration is designed to direct forces more evenly from the end of the trough hatch opening into the car end structure which is more massive and more capable of evenly absorbing and further distributing forces. *A connector plate 50 overlaps and interconnects adjacent portions of the longitudinally extending coaming 47 and an upstanding leg portion of the rigidifying stiffener 48 to evenly dump longitudinal forces into the stiffener member for distribution through the end portion of the roof and into the car end structure.*

Thus, it has been shown by the foregoing that an improved roof structure is provided which increases volumetric capacity of the car and also has a structural integrity due to the reinforcement members surrounding the curved roof sheets.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

We claim:

1. A covered hopper car having spaced side wall units having [wall] *side* posts, end hoppers and intermediate hopper means, a roof *support* structure comprising:

curved roof sheet means extending on the top of the hopper car and having side margins;

hatch opening means with cover means and said opening means being adapted to receive lading for entry into said end hoppers and into said intermediate hopper means;

side beam means extending the length of the vehicle and being mounted to the side wall unit and providing a connection with the roof sheet means;

said side beam means comprising first and second angle members forming a longitudinally extending beam member;

said first angle member having a lip extending inwardly and outwardly from the side wall unit to said roof sheet means;

partition means with an arcuate top conforming to the contour of the curved roof sheet means and being connected with the side wall units and roof sheet means to provide a rigid structural interconnection between the attached car members;

connection means mounted on the arcuate top of said partition means and providing a structural transition member for improved force distribution between the partition means and the roof sheet means;

*stiffener means extending across and attached to said partition means;* weld means connecting the stiffener means with said side [plate] *beam* means and thereby forming reinforcing structure surrounding the side margins of the curved roof sheet means.

2. The roof structure of claim 1 wherein said second angle member includes:

a beam angle attached to said side wall unit;

said beam angle having means extending vertically along said side wall unit and having means extending horizontally outwardly therefrom and connected to said [wall] *side* posts;

said first angle member of the side plate means comprising means extending upwardly from the horizontal section of the second angle member and also having transition means extending inwardly of the vehicle beyond the side wall unit and connected with the curved roof sheet means.

3. The roof structure of claim 1 and:

*said* stiffener means [extending across and attached to said partition means and] reinforcing said partition means;

said stiffener means comprising first and second angle members having leg portions attached to said partition means;

said angle [member] *members* being spaced on opposite sides of the partition in an overlapping relationship whereby the leg portions of one angle member are vertically spaced from the leg portions of the other angle [members] *member.*

4. The roof structure of claim 1, and:

hatch means located in said roof and including *an* upstanding coaming attached to the roof sheet means;

said hatch means comprising a trough hatch extending generally the length of the hopper car;

said coaming including longitudinally extending side coaming and transversely extending end coaming;

wedge-type stiffener means having an upstanding end attached to the end coaming and having a tapered body attached to said roof sheet means to strengthen the end of the structure at the end of the car;

connector plate means attached to the side coaming and to the wedge-type stiffener means and providing a reinforced connection.

5. The roof structure of claim 4, wherein said roof sheet means comprises:

a curved sheet member with side edges overlapping the lip of the first angle member;

said curved sheet member having second, inner edges attached to the longitudinal coaming.

6. The roof structure of claim 5 wherein the curved sheet member includes:

a metal sheet having a single radius, circular curve.

* * * * *